(12) United States Patent
Johnston

(10) Patent No.: US 9,677,596 B2
(45) Date of Patent: Jun. 13, 2017

(54) COMPRESSION MOLDING FASTENER

(71) Applicant: CONTINENTAL STRUCTURAL PLASTICS, INC., Auburn Hills, MI (US)

(72) Inventor: Christopher Johnston, Petoskey, MI (US)

( * ) Notice: Subject to any disclaimer, the term of this patent is extended or adjusted under 35 U.S.C. 154(b) by 155 days.

(21) Appl. No.: 14/403,545

(22) PCT Filed: May 22, 2013

(86) PCT No.: PCT/US2013/042257
§ 371 (c)(1),
(2) Date: Nov. 24, 2014

(87) PCT Pub. No.: WO2013/177298
PCT Pub. Date: Nov. 28, 2013

(65) Prior Publication Data
US 2015/0176632 A1 Jun. 25, 2015

Related U.S. Application Data

(60) Provisional application No. 61/650,097, filed on May 22, 2012.

(51) Int. Cl.
*F16B 37/14* (2006.01)
*B29C 43/36* (2006.01)
(Continued)

(52) U.S. Cl.
CPC ............. *F16B 37/14* (2013.01); *B29C 33/12* (2013.01); *B29C 43/18* (2013.01); *B29C 43/36* (2013.01);
(Continued)

(58) Field of Classification Search
CPC ........ F16B 31/122; F16B 37/14; F16B 3/122; F16B 37/147
(Continued)

(56) References Cited

U.S. PATENT DOCUMENTS

| 979,361 A | * | 12/1910 | Vulpescu | ............... A43B 13/34 296/139 |
| 1,456,215 A | * | 5/1923 | Brightman | ............. B23G 9/005 411/429 |

(Continued)

FOREIGN PATENT DOCUMENTS

| DE | 1969833 U | 10/1967 |
| DE | 102006010148 A1 | 9/2007 |

(Continued)

OTHER PUBLICATIONS

Extended Search Report from European Patent Office dated Dec. 12, 2015 for application No. PCT/US2013/042257.

*Primary Examiner* — Flemming Saether
(74) *Attorney, Agent, or Firm* — Avery N. Goldstein; Blue Filament Law PLLC

(57) ABSTRACT

A method for forming an elevated surface feature for compression molded assemblies includes the placement of an afore-mentioned insert onto an actuated fixture pin with the pin initially in a retracted position. An upper portion of a mold configured with said retracted actuated fixture pin over a preform of pre-preg plies placed on the bottom portion of the mold is then closed. The fixture pin is actuated towards the pre-preg plies when a flowable material fills a molding cavity in the upper portion of the mold. The cavity is configured to form the elevated surface feature with the advancing action of the insert packs out the surface feature under the pressure of the pin to eliminate porosity in the elevated surface feature in the molding cavity.

9 Claims, 2 Drawing Sheets

(51) Int. Cl.
  *B29C 43/18* (2006.01)
  *B29C 70/68* (2006.01)
  *B29C 33/12* (2006.01)
  *B29C 70/86* (2006.01)
  *B29K 101/12* (2006.01)
  *B29K 105/08* (2006.01)
  *B29L 31/00* (2006.01)
  *F16B 37/12* (2006.01)

(52) U.S. Cl.
  CPC ............ *B29C 70/682* (2013.01); *B29C 70/86* (2013.01); *B29C 2043/3602* (2013.01); *B29K 2101/12* (2013.01); *B29K 2105/0872* (2013.01); *B29L 2031/727* (2013.01); *F16B 37/122* (2013.01)

(58) Field of Classification Search
  USPC ............... 411/429, 82, 180, 179; D8/397
  See application file for complete search history.

(56) References Cited

U.S. PATENT DOCUMENTS

| | | | | |
|---|---|---|---|---|
| 2,972,730 A * | 2/1961 | Abrams | ................ | H01R 13/41 |
| | | | | 174/166 S |
| 3,364,806 A * | 1/1968 | Chaivre | ................ | F16B 37/14 |
| | | | | 301/37.374 |
| 3,530,921 A | 9/1970 | Ernest | | |
| 3,742,995 A | 7/1973 | Confer et al. | | |
| 3,960,047 A * | 6/1976 | Liffick | ................ | B60B 3/16 |
| | | | | 301/35.623 |
| 4,143,578 A * | 3/1979 | Becker | ................ | F16B 37/14 |
| | | | | 411/430 |
| 4,673,542 A | 6/1987 | Wigner et al. | | |
| 4,869,440 A | 9/1989 | Toral et al. | | |
| 5,391,029 A | 2/1995 | Fardell | | |
| 5,492,452 A | 2/1996 | Kirsch et al. | | |
| 5,800,109 A | 9/1998 | Carruthers | | |
| 5,810,534 A | 9/1998 | Carlisle et al. | | |
| 5,870,870 A | 2/1999 | Utzman | | |
| 5,890,842 A | 4/1999 | Dahill | | |
| D427,511 S * | 7/2000 | Weld | ............... | D8/397 |
| 6,173,460 B1 | 1/2001 | Mitchell | | |
| 6,244,073 B1* | 6/2001 | Kaping, Jr. | ............ | A44C 7/003 |
| | | | | 24/105 |
| 6,692,207 B1 | 2/2004 | Bailey | | |
| 7,077,613 B2 | 7/2006 | Rudolph et al. | | |
| D549,568 S * | 8/2007 | Schaeffer | ............... | D8/397 |
| 7,284,940 B2 | 10/2007 | Lee | | |
| 7,374,384 B2 | 5/2008 | Sutt, Jr. | | |
| 7,665,942 B2 | 2/2010 | Tadros et al. | | |
| 7,682,116 B2 | 3/2010 | Cabrele | | |
| 7,955,024 B2 | 6/2011 | Driscoll et al. | | |
| 2006/0276905 A1 | 12/2006 | Calamel | | |
| 2011/0281133 A1* | 11/2011 | Moessinger | ............ | B22D 17/24 |
| | | | | 428/600 |
| 2012/0168994 A1* | 7/2012 | Dai | ................ | B29C 45/14065 |
| | | | | 264/571 |

FOREIGN PATENT DOCUMENTS

| | | |
|---|---|---|
| EP | 1447205 A2 | 8/2004 |
| GB | 376704 A | 7/1932 |
| WO | 2011116890 A1 | 9/2011 |

* cited by examiner

COMPRESSION MOLDING FASTENER

CROSS-REFERENCE TO RELATED APPLICATION

This application claims priority of U.S. Provisional Patent Application Ser. No. 61/650,097 filed May 22, 2012, which is incorporated herein by reference.

FIELD OF THE INVENTION

The present invention in general relates to compression molding and in particular to a fastener insert to improve manufacturability of irregular features in sheet molding compound and pre-preg compression molding.

BACKGROUND OF THE INVENTION

Composite materials are engineered or naturally occurring materials made from two or more constituent materials with significantly different physical or chemical properties which remain separate and distinct at the macroscopic or microscopic scale within the finished structure. There are two categories of constituent materials: matrix and reinforcement. At least one portion of each type is required. The matrix material surrounds and supports the reinforcement materials by maintaining their relative positions. The reinforcements impart their special mechanical and physical properties to enhance the matrix properties. A synergism produces material properties unavailable from the individual constituent materials, while the wide variety of matrix and strengthening materials allows the designer of the product or structure to choose an optimum combination.

Commercially produced composites often use a polymer matrix material often called a resin solution. There are many different polymers available depending upon the starting raw ingredients which may be placed into several broad categories, each with numerous variations. Examples of the most common categories for categorizing polymers include polyester, vinyl ester, epoxy, phenolic, polyimide, polyamide, polypropylene, PEEK, and others.

The reinforcement materials for composites are typically fibers but also may be commonly ground minerals. Fiber-reinforced composite materials can be divided into two main categories normally referred to as short fiber-reinforced materials and continuous fiber-reinforced materials. Continuous reinforced materials often constitute a layered or laminated structure. The woven and continuous fiber styles are typically available in a variety of forms, being pre-impregnated with the given matrix (resin), dry, uni-directional tapes of various widths, plain weave, harness satins, braided, and stitched. Various methods have been developed to reduce the resin content of the composite material, by increasing the fiber content. Typically, composite materials may have a ratio that ranges from 60% resin and 40% fiber to a composite with 40% resin and 60% fiber content. The strength of a product formed with composites is greatly dependent on the ratio of resin to reinforcement material.

Pre-preg is the general term used for "pre-impregnated" composite fibers where a material, such as epoxy is already present. As described above, pre-preg fibers usually have of a weave or are uni-directional. Pre-preg materials already contain an amount of the matrix material used to bond the pre-impregnated fibers together and to other components during manufacture. Pre-preg materials are mostly stored in cooled areas since activation is most commonly done by heat. Hence, composite structures built of pre-pregs typically require an oven or autoclave to cure out.

Pre-preg compression molding utilizes pre-preg materials, which are typically made from continuous fiber reinforced materials, that have been cut into sheets or plies with specific patterns. During the compression molding process, the pre-preg plies are hand assembled into a preform made up of multiple layers of the pre-preg ply material, and then the preform is placed into a mold and compressed, which consolidates the layers of pre-preg material and cures the pre-preg. However, since pre-preg material typically has a continuous fiber format, the pre-preg material typically will not flow in the mold to any significant degree. Consequently, when there are irregular thicknesses or features that standout from the surface, such as a fastener boss (as best seen in FIG. 5), that require a depression or void in the mold to be filled it is helpful to add a material that will flow to either the pre-preg as a separate layer or to the preform as a separate material located adjacent to the irregular geometry that needs to be filled. However, even with adding extra material, the problems associated with getting material to flow into irregular geometries still persist. In the case of bosses into which an insert will be installed either as part of the molding process or post molding, it is difficult to get these bosses to completely fill without porosity, or material voids. The existence of porosity in a molded structure can create leak paths. In addition, post molding assembly of inserts such as fasteners or threaded channels into a molded boss that has poor flow can result in brittle material. The brittle features of the bosses and other securement features may lead to premature failures of compression molded assemblies, and potentially dire consequences for a user depending on the strength and reliability of the molded assembly.

Thus, there exists a need for devices and methods that form more reliable and robust surface features that are free of material voiding, where the surface features standout above a compression molded surface including surface features such as bosses that accommodate fastener inserts.

SUMMARY OF THE INVENTION

An insert is provided that has a cylindrical center space extending from a counter bore within an interior of the insert with a series of threads. The center space is defined by cylinder wall to accommodate a fastener. A multi-faced region with a plurality of flat faces is provided at the distal end of the recessed area. A tapered region extends from the multi-faced region that terminates in a sharpened leading edge.

A method for forming an elevated surface feature for compression molded assemblies includes the placement of an afore-mentioned insert onto an actuated fixture pin with the pin initially in a retracted position. An upper portion of a mold configured with said retracted actuated fixture pin over a preform of pre-preg plies placed on the bottom portion of the mold is then closed. The fixture pin is actuated towards the pre-preg plies when a flowable material fills a molding cavity in the upper portion of the mold. The cavity is configured to form the elevated surface feature with the advancing action of the insert packs out the surface feature under the pressure of the pin to eliminate porosity in the elevated surface feature in the molding cavity.

DETAILED DESCRIPTION OF THE PREFERRED EMBODIMENTS

The present invention has utility as a device and method to form more reliable and robust surface features for compression molded assemblies that are free of material voiding, where the surface features standout above the molded surface including surface features such as bosses that accommodate fastener inserts.

Figure 5:
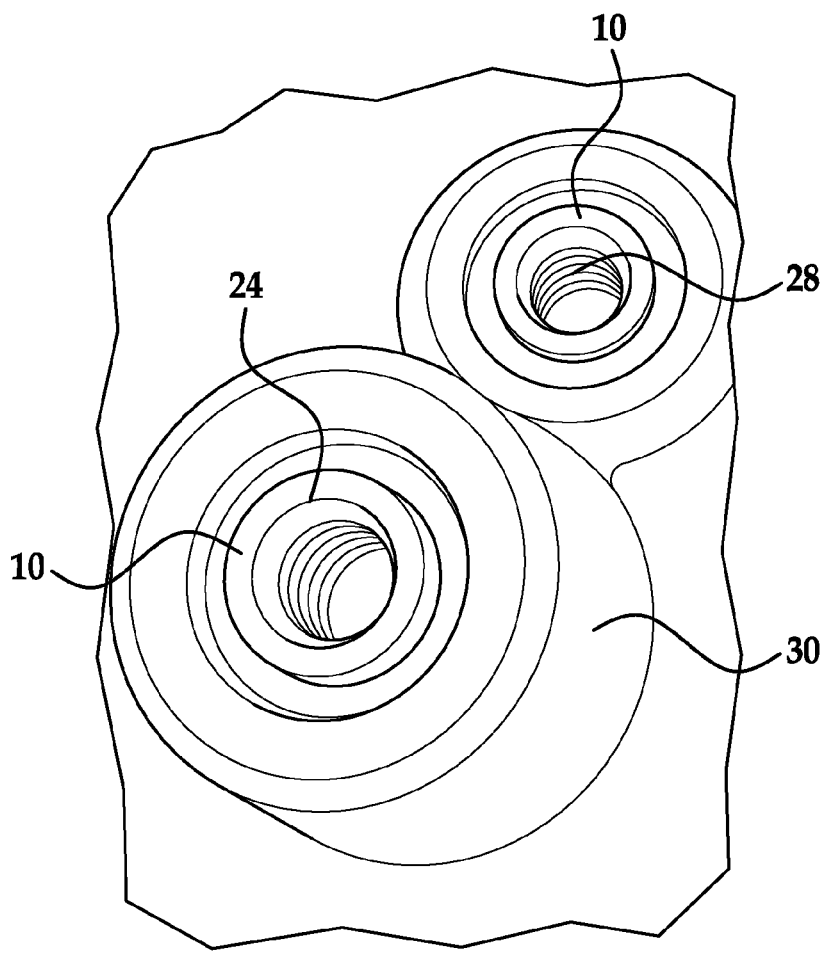
FIG. 5 illustrates two adjacent bosses formed with an embodiment of the inventive insert shown in FIGS. 1-4.

Embodiments of the invention provide an insert that is insert-molded into features of compression molded designs such as in irregular or elevated surfaces whereby the inventive insert is placed onto a pin that can be actuated with a hydraulic cylinder to advance the pin or retract the pin. Initially during the molding process, an embodiment of the inventive insert is placed onto a fixture pin and the pin is in a retracted position. Subsequently, as the mold is closed onto a preform of pre-preg plies, the pin holding an embodiment of the inventive insert is in a retracted position to allow for more space for additional material to move into position within the elevated surface feature, such as a boss, as shown in FIG. 5. Once acceptable molding pressures are reached, the fixture pin is then actuated into the boss, thereby advancing the inventive insert into position and using the advancing action of the inventive insert to help pack out the boss or surface feature under the pressure of the pin to eliminate porosity in the elevated surface feature in the molding cavity. However, for the inventive insert to move into position, the inventive insert may have to pass through layers of pre-preg that are made from continuous fibers in a woven or unidirectional format. In order to penetrate the layers of fiber reinforced pre-preg, embodiments of the inventive insert have a sharpened leading edge or point to penetrate the layers of reinforcement. In contrast, previous insert designs have used a flattened leading edge. Furthermore, embodiments of the inventive insert provide additional features for improved ease of manufacturing including; a die lock condition that keeps the fixture pin from pulling out of the insert, a head design (open end) of the inventive insert that is circular to allow the inventive insert to sit down into a machined pocket on the fixture pin to help seal it off from resin that is flowing in the mold, and a smooth counter-bore at the open end of the inventive insert before the threads in the inventive insert that also acts as a sealing feature when attached to the fixture pin.

Figure 1:
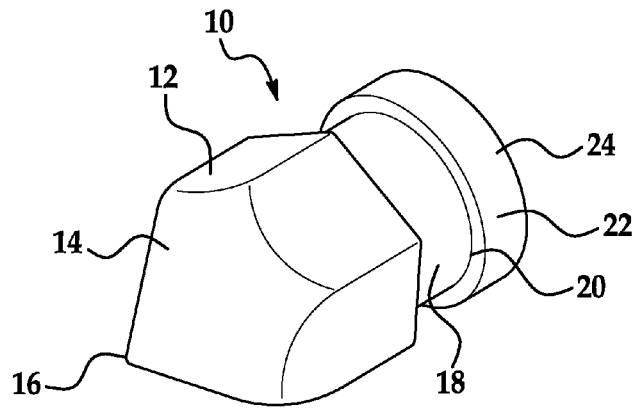
FIG. 1 is a perspective view of an embodiment of an inventive insert to improve manufacturability of irregular features in sheet molding compound and pre-preg compression molding.
Figure 2:
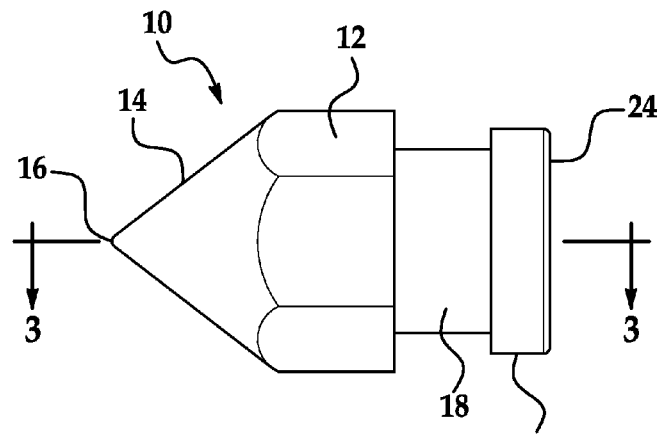
FIG. 2 is a side view of the inventive insert of FIG. 1.
Figure 3:
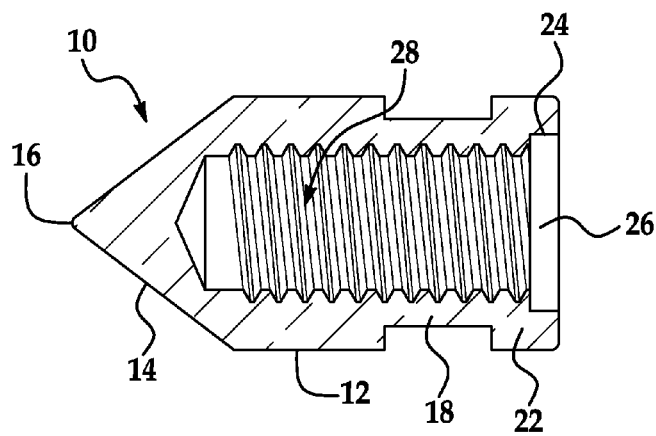
FIG. 3 is a cross-sectional view of the insert of FIGS. 1 and 2 along line 3-3 illustrating the fastening threads.
Figure 4:
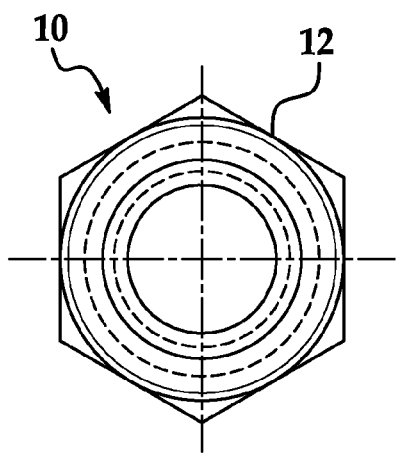
FIG. 4 illustrates a top view of the insert of FIGS. 1 and 2.

Referring now to the figures, FIG. 1 is a perspective view of an inventive insert 10 that improves manufacturability of irregular features in sheet molding compound and pre-preg compression molding. The insert 10 is made of variety of materials including a metal, a metal alloy, wood, high temperature plastics or composite materials, and a combination thereof. The insert 10 has a series of flat faces 12 as illustrated in FIGS. 2 and 4 to lock the insert 10 in a fixed non-rotational position with respect to the molded object the insert 10 will be inserted into. As best shown in FIG. 4, the insert 10 has six flat faces 12. However, it is noted that other embodiments may have more or less rotational locking faces, such as 3, 4, 5, 7, 8, 9, or 10 faces and may have additional locking features to anchor into the molding compounds. The insert 10 has a tapered section 14 to assist in the insertion of the insert 10 into the molding compounds. The tapered section 14 terminates in a sharpened leading edge or point 16 to penetrate the layers of reinforcement fibers that may be present in the pre-preg material, sheet molding compound, or other composites. Recessed area 18 provides an area for the molding material to flow around the insert 10 that helps to retain the insert 10 in a molded product. The lip area 20 and retaining ring 22 prevent the resin or other molding materials from flowing beyond the visible end (head) 24 of the insert 10. The recessed area 18 has a circumference that is less than that of the retaining ring 22. The circular shape of the visible end 24 enables the insert 10 to sit down into a machined pocket on the fixture pin (not shown) to help seal the off the fixture pin from resin that is flowing in the mold. FIG. 3 provides a cross-sectional view of the inventive insert of FIGS. 1 and 2 along line A-A illustrating a smooth counter-bore region 26 and fastening threads 28 formed in the wall of a cylinder formed in the interior of the fastener. The smooth counter-bore 26 at the open end 24 of the insert 10 before the threads 28 also acts as a sealing feature when attached to the fixture pin. The threads 28 are designed to engage fasteners that connect the molded assembly to other objects (not shown). In some embodiments of the present invention, the threads 28 are defined by a sleeve with larger bore of the insert 10. The sleeve being of like or different composition relative to insert 10. The insert 10 is subjected to heating in a mold cavity in certain embodiments to facilitate flowable material cure.

FIG. 5 illustrates two adjacent bosses in a finished molded product formed with an embodiment of the inventive insert 10 shown in FIGS. 1-4. The insert 10 is centered in the boss 30. The open end 24 of the insert 10 extends beyond the molded material that forms the boss. Threads 28 act as securements of a molded assembly that is attached to the bosses 30.

The foregoing description is illustrative of particular embodiments of the invention, but is not meant to be a limitation upon the practice thereof. The following claims, including all equivalents thereof, are intended to define the scope of the invention.

The invention claimed is:

1. A molded article comprising:
    molded material; and
    an insert comprising:
    a head with an open end, a lip, and a circular retaining ring defined by parallel walls and surrounding a counter bore;
    a cylindrical center space extending from the counter bore within an interior of said insert with a series of threads formed on a cylindrical wall, the cylindrical center space defined by the cylindrical wall to accommodate a fastener;
    a multi-faced region with a plurality of flat faces on an exterior of the insert and surrounding the cylindrical center space; and
    a tapered region extended from said multi-faced region that terminates in a sharpened leading edge;
    wherein said molded material is in contact with said plurality of flat faces and said tapered region of the insert.

2. The molded article of claim 1 wherein said insert further comprising a recessed area on the exterior of the insert and located intermediate between said open end and said multi-faced region.

3. The molded article of claim 1 wherein the sharpened leading edge of said insert forms a point.

4. The molded article of claim 2 wherein said recessed area of said insert below said lip has a circumference that is less than the circumference of said retaining ring.

5. The molded article of claim 1 wherein said insert is formed of a metal, a metal alloy, wood, high temperature plastics, or composite materials.

6. A method for forming an elevated surface feature for compression molded assemblies; said method comprising:
   placing an insert on to an actuated fixture pin with the pin initially in a retracted position;
   closing an upper portion of a mold configured with said retracted actuated fixture pin over a preform of pre-preg plies placed on the bottom portion of said mold; and
   actuating said fixture pin towards said pre-preg plies when a flowable material fills a molding cavity in the upper portion of the mold, said cavity configured to form said elevated surface feature; the advancing action of said insert packs out the surface feature under the pressure of the pin to eliminate porosity in the elevated surface feature in the molding cavity; and
   wherein said insert comprises: a head with an open end, a lip, and a retaining ring surrounding a counter bore;
   a cylindrical center space extending from the counter bore within an interior of said insert with a series of threads formed on a cylindrical wall, the cylindrical center space defined by the cylindrical wall to accommodate a fastener;
   a multi-faced region with a plurality of flat faces on an exterior of the insert and surrounding the cylindrical center space; and
   a tapered region extended from said multi-faced region that terminates in a sharpened leading edge; wherein the sharpened leading edge forms a point; a rounded recessed area below said lip has a circumference that is less than the circumference of said retaining ring, said insert is formed of a metal, a metal alloy, wood, high temperature plastics, or composite materials.

7. The method of claim 6 further comprising heating said cavity to cure said flowable material.

8. The method of claim 6 further comprising forming a seal between the counter bore and said actuated fixture pin.

9. The method of claim 6 further comprising preventing said flowable material from flowing beyond said retaining ring and said lip.

* * * * *